(12) United States Patent
Vanselous

(10) Patent No.: US 7,162,278 B2
(45) Date of Patent: Jan. 9, 2007

(54) SECURED WIRELESS HANDSETS

(75) Inventor: Jeremy Daniel Vanselous, Haslet, TX (US)

(73) Assignee: Solectron Corporation, Milpitas, CA (US)

( * ) Notice: Subject to any disclaimer, the term of this patent is extended or adjusted under 35 U.S.C. 154(b) by 136 days.

(21) Appl. No.: 10/788,561

(22) Filed: Feb. 27, 2004

(65) Prior Publication Data

US 2005/0192069 A1    Sep. 1, 2005

(51) Int. Cl.
*H04M 1/00*    (2006.01)
(52) U.S. Cl. ............... 455/569.2; 455/66.1; 455/346
(58) Field of Classification Search ........... 455/67.11, 455/90
See application file for complete search history.

(56) References Cited

U.S. PATENT DOCUMENTS

| | | | |
|---|---|---|---|
| 5,157,722 A | | 10/1992 | Hollowed et al. |
| 5,568,548 A | | 10/1996 | Repplinger et al. |
| 5,659,887 A | | 8/1997 | Ooe |
| 5,828,750 A | * | 10/1998 | Perala ................ 379/446 |
| 5,956,399 A | | 9/1999 | Whitley et al. |
| 6,269,258 B1 | * | 7/2001 | Peiker ................ 455/569.2 |
| 6,377,825 B1 | | 4/2002 | Kennedy et al. |
| 6,397,046 B1 | * | 5/2002 | Kfoury ................ 455/90.1 |
| 6,491,194 B1 | | 12/2002 | Marvin |
| 6,636,749 B1 | * | 10/2003 | Holmes et al. ......... 455/569.2 |
| 6,659,382 B1 | * | 12/2003 | Ryczek ................ 242/379 |
| 2002/0197911 A1 | | 12/2002 | Holmes et al. |
| 2003/0152442 A1 | * | 8/2003 | Curley et al. ............ 411/427 |

* cited by examiner

*Primary Examiner*—Lester G. Kincaid
*Assistant Examiner*—Fred A. Casca
(74) *Attorney, Agent, or Firm*—Robert Moll

(57) ABSTRACT

The present invention relates to secured wireless handsets that discourage or reduce unauthorized removal, loss, or theft of a handset, while allowing the person to communicate hands free. In an embodiment the wireless handset includes a first attachment of a T-nut secured the wireless handset. The T-nut is attached to the cradle by a threaded bolt. A second attachment secures the cradle to a designated communication site such as in a vehicle. In another embodiment, the first attachment includes a security block for obstructing the release mechanisms of a latch on the cradle to secure the wireless handset to the cradle. The secured wireless handsets described are also applicable to non-vehicular communication sites where wireless handset removal from the communication site is a concern.

19 Claims, 5 Drawing Sheets

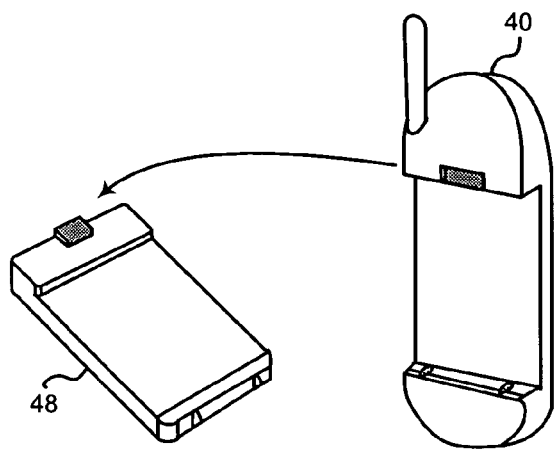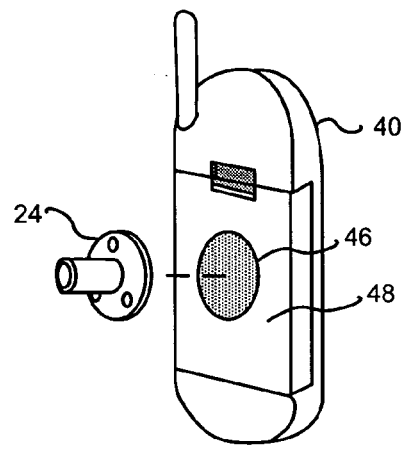
FIGURE 4A          FIGURE 4B
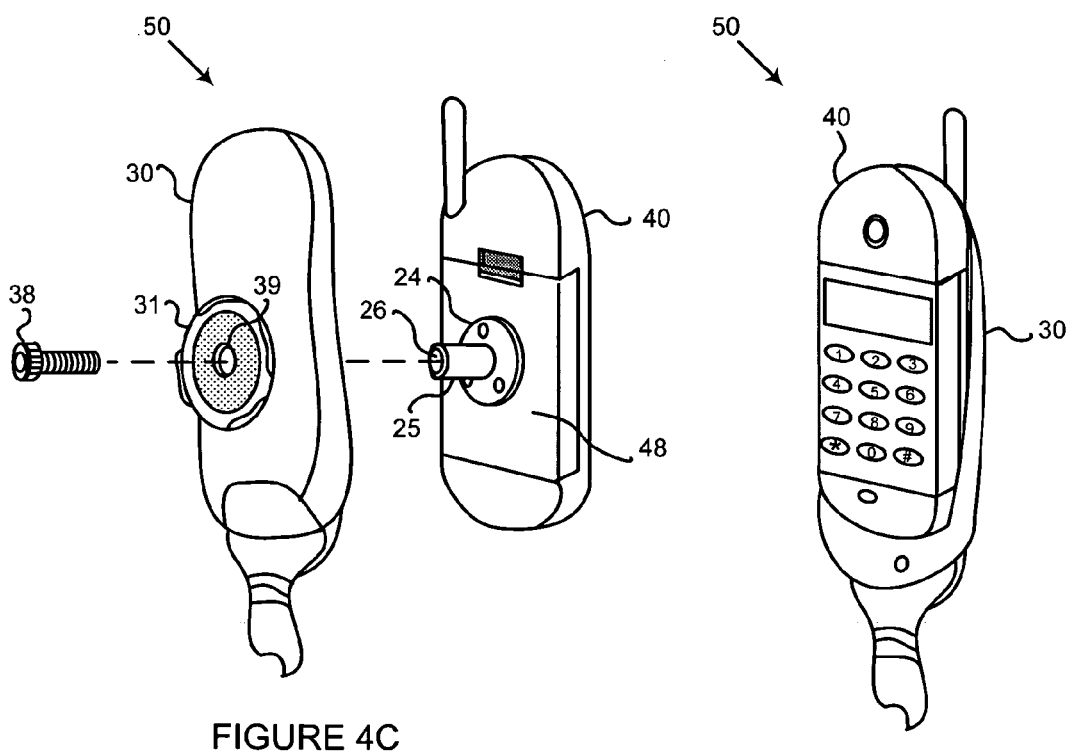
FIGURE 4C          FIGURE 4D

US 7,162,278 B2

SECURED WIRELESS HANDSETS

BACKGROUND

The present invention relates to systems and methods to secure wireless handsets especially in vehicles.

With rapid declining cost, increasing functions, better performance, and portability, sales of wireless handsets such as the cell phones are widespread. Because of these advantages, law enforcement vehicles, delivery trucks, taxis, and company vehicles are often equipped with wireless handsets. However, the cradles that hold and supply power to the wireless handsets do not prevent easy removal and may encourage the driver to drive with one hand while talking or even no hands while dialing a phone number. Further, vibrations and shaking during transportation may cause the unsecured wireless handsets to fall out of the cradle.

It would be desirable if wireless handsets could be inexpensively secured in certain environments to prevent unauthorized removal or use and to encourage hands free communication on the wireless handset while driving a vehicle.

SUMMARY OF THE INVENTION

The present invention relates to systems and methods for securing a wireless handset to prevent easy removal of the wireless handset and encourage hands free communication. In an embodiment, the secured wireless handset includes a first attachment using a T-nut assembly to secure the wireless handset to the cradle. A second attachment secures the cradle to a designated communication site. In another embodiment, the first attachment includes a security block for obstructing a release mechanism of a latch on the cradle to secure the wireless handset to the cradle. Although primarily discussed in the context of vehicles, the secured wireless handset is applicable to any designated communication site where wireless handset loss or removal is a concern.

BRIEF DESCRIPTION OF THE DRAWINGS

FIG. 4A shows a wireless handset with the battery removed.

FIG. 4B shows a T-nut and the back of the battery of the wireless handset.

FIG. 4C is an exploded view of the back of the cradle and wireless handset, and the threaded bolt and T-nut.

FIG. 4D is a perspective view of a secured wireless handset.

DETAILED DESCRIPTION OF THE PREFERRED EMBODIMENTS

Figure 1:
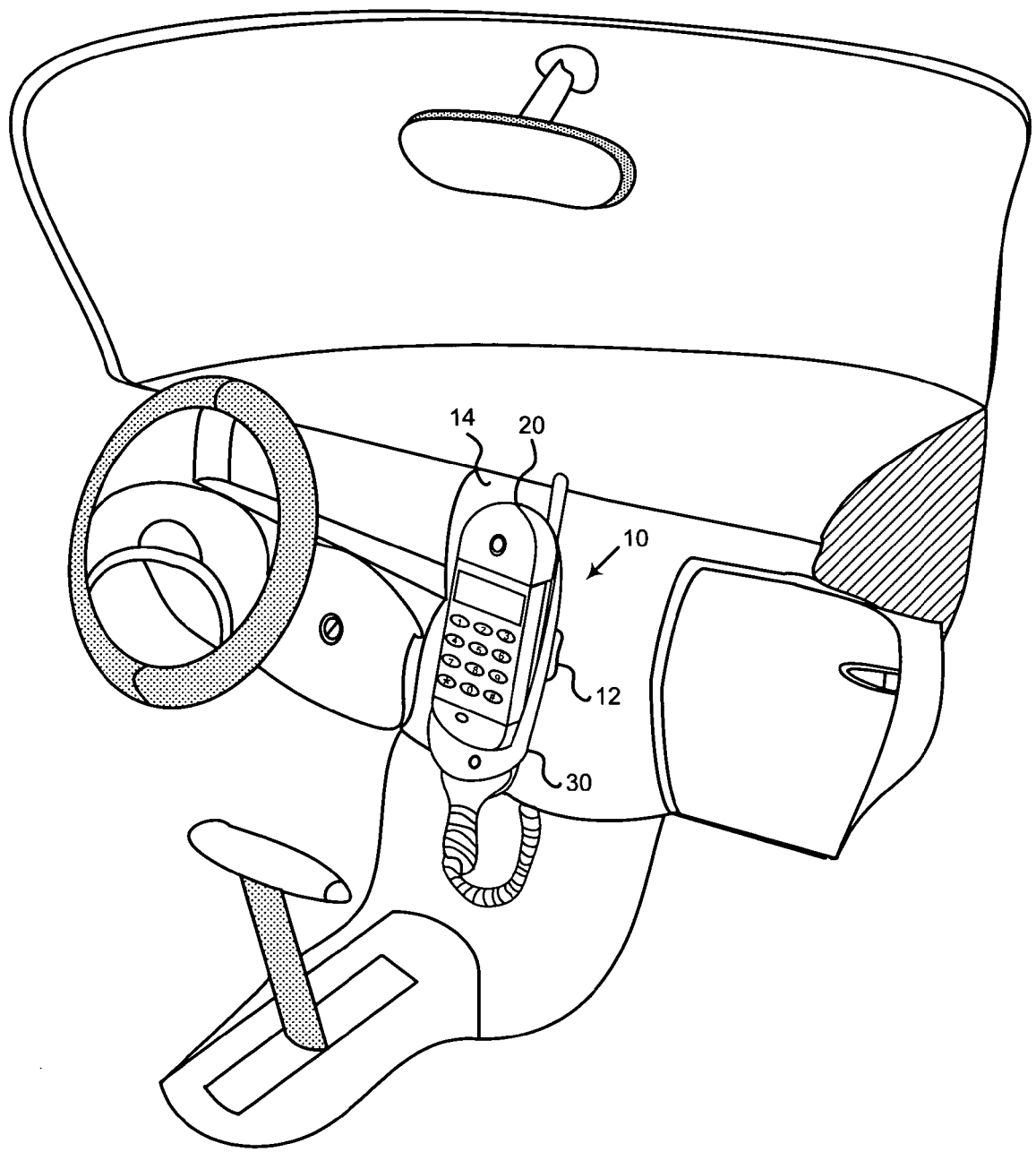
FIG. 1 illustrates a wireless handset secured to a vehicle dashboard.

The following description includes the best mode of carrying out the invention. The detailed description is made for the purpose of illustrating the general principles of the invention and should not be taken in a limiting sense. The scope of the invention is determined by reference to the claims.

I assign each part, even if structurally identical to another part, a unique reference number wherever that part is shown in the drawing figures. A dashed circle indicates a portion of a figure that is enlarged in another figure. The figure showing the enlarged portion is indicated by a reference number tied to the dashed circle.

FIG. 1 illustrates a secured wireless handset 10 including a wireless handset 20 in a cradle 30 secured to a communication site such as a vehicle dashboard 14 through cradle installation hardware 12. The cradle 30 can be electrically connected to a DC outlet to provide power to the wireless handset 20 and/or charge up the battery of the wireless handset 20. The wireless handset 20 is securely attached to the cradle 30 with a first attachment as will be described to discourage unauthorized removal of the wireless handset 20 and to ensure the wireless handset 20 will not fall out of the cradle 30. The first attachment encompasses a variety of structures that will secure the wireless handset to the cradle. This does not mean it cannot be broken, but that lawful persons would be deterred from further effort. The secured wireless handset 10 also encourages hands free communication through a speakerphone or a headset (not shown) attached to the wireless handset 20 or cradle 30.

Figure 2A:
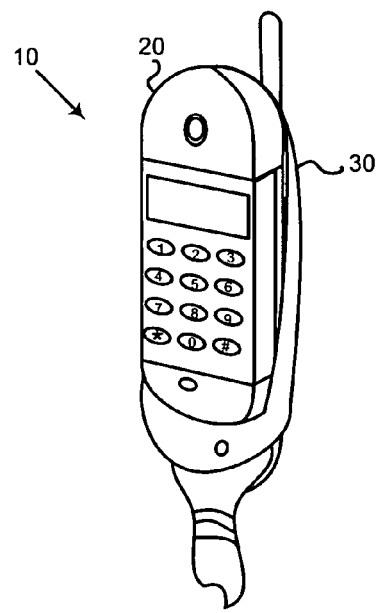
FIG. 2A is a perspective view of a wireless handset in a cradle.

FIG. 2A is a perspective view of a secured wireless handset 10 formed by the wireless handset 20 attached to the cradle 30.

Figure 2B:
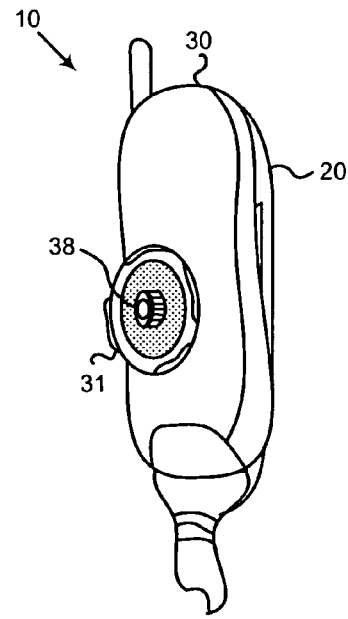
FIG. 2B is a perspective view of the back of the cradle.

FIG. 2B is a perspective view of the back of the cradle 30 with a threaded bolt 38 through a cradle mount 31 on the back of the cradle 30 and secured to the wireless handset 20.

Figure 2C:
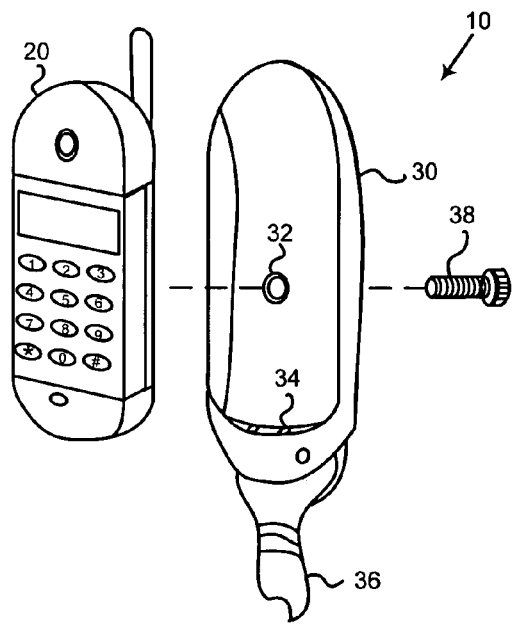
FIG. 2C is an exploded view of the wireless handset, a cradle, and a threaded bolt.

FIG. 2C is an exploded view of the secured wireless handset 10. The cradle 30 includes electrical contacts 34 and a power cord 36, and is attached to the wireless handset 20 by the threaded bolt 38 into a cradle hole 32.

Figure 2D:
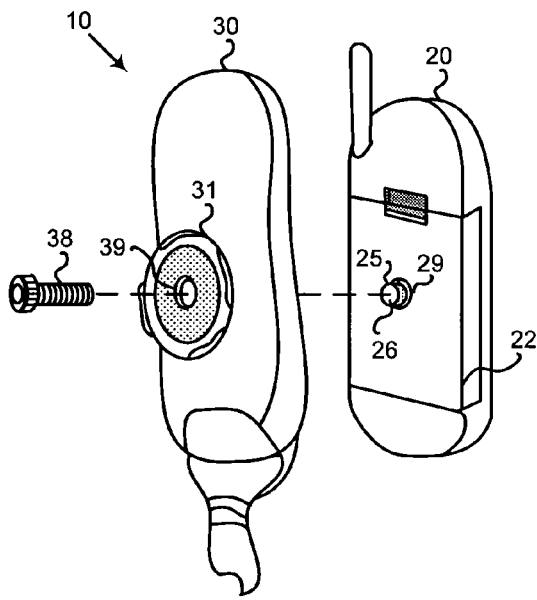
FIG. 2D is an exploded view of the back of the cradle and wireless handset and the threaded bolt.

FIG. 2D is an exploded view of the back of the secured wireless handset 10. In the first attachment, the threaded bolt 38 is inserted through the first through hole 39 of the cradle mount 31 on the back of the cradle 30 into the internal threads 26 of the T-nut barrel 25 protruding from the second through hole 29 of the battery cover 22 to form a secured wireless handset 10. The first through hole 39 of cradle mount 31 defines the location and diameter of the cradle hole 32 shown in FIG. 2C and the second through hole 29 in the battery cover 22 of the wireless handset 20.

Figure 3A:
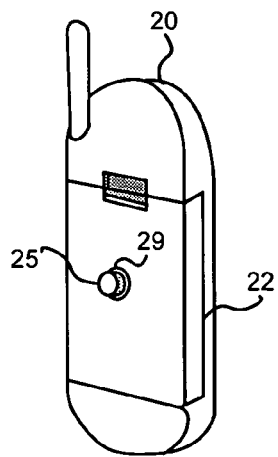
FIG. 3A is a perspective view showing a T-nut protruding through the battery cover of the wireless handset.

FIG. 3A is a perspective view of the back of the wireless handset 20 and the T-nut barrel 25 protruding through the second through hole 29 of the battery cover 22.

Figure 3B:
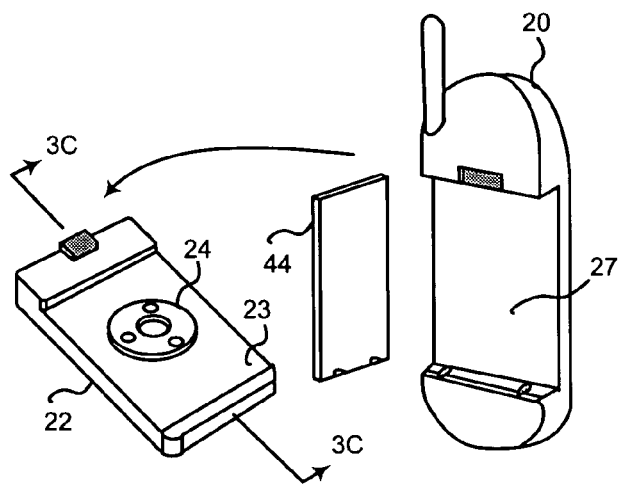
FIG. 3B shows the wireless handset with the battery cover removed to show the battery and the T-nut.

FIG. 3B shows the battery cover 22 as removed from the wireless handset 20 to reveal the battery 44 and to show how the T-nut 24 is inserted through the internal surface 23 of the battery cover 22. This embodiment of the first attachment can be used if sufficient clearance exists between the internal surfaces 23 and 27 for the T-nut 24 and the battery 44. In another embodiment, the wireless handset 20 has no battery inside and the electrical contacts 34 shown in FIG. 2C supply electrical power to the wireless handset 20.

Figure 3C:
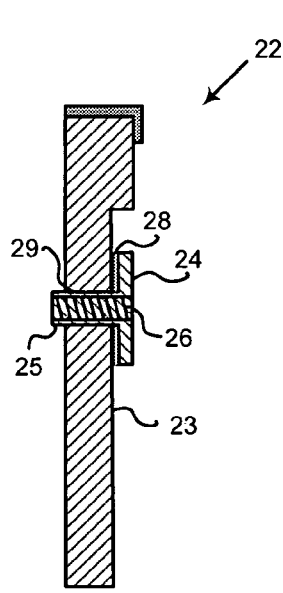
FIG. 3C is a section view of the battery cover wall with a T-nut attached.

FIG. 3C is a section view of the battery cover 22 with the T-nut 24 where the T-nut barrel 25 with internal threads 26 is inserted through the second through hole 29 and secured to the internal surface 23 of the battery cover 22 with an adhesive material 28. The adhesive material 28 can be any suitable material such as a double sided adhesive tape, e.g., Duck Brand Permanent Mounting Tape or an adhesive such as the 3M™ High Strength 90 spray adhesive.

Figure 3D:
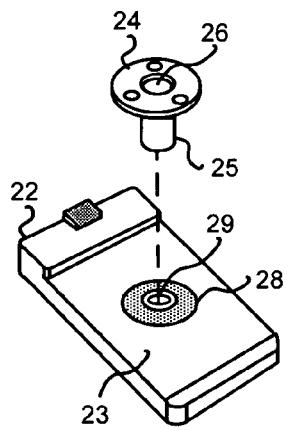
FIG. 3D is an exploded view of the T-nut and the battery cover.

FIG. 3D is an exploded view of the T-nut 24 before insertion in the battery cover 22. During assembly the T-nut barrel 25 with internal threads 26 is inserted through the second through hole 29 and secured onto the internal surface 23 by the adhesive material 28.

Figure 3E:
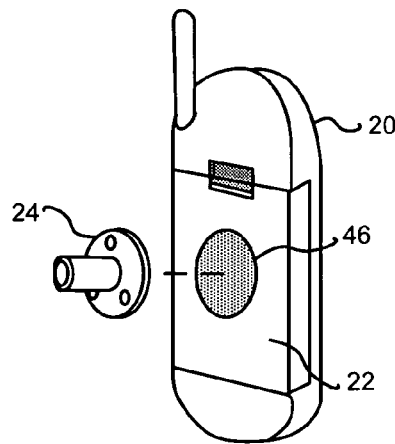
FIG. 3E shows the location of the external attachment of a T-nut onto the wireless handset.

FIG. 3E shows an alternative embodiment of the first attachment where the T-nut 24 will be attached to the external surface of the battery cover 22. This embodiment can be used if there is insufficient clearance for the T-nut 24 to be sandwiched between the internal surfaces 23 and 27 along with or without the battery 44 shown in FIG. 3B. The T-nut 24 is attached to the external surface of the battery cover 22 through a suitable adhesive material 46 such as double-sided adhesive tape including a Duck Brand Permanent Mounting Tape or an adhesive such as the 3M™ High Strength 90 spray adhesive.

FIG. 4A shows a battery 48 as removed from a wireless handset 40. The battery 48 is part of the battery cover and mounted on the back of the wireless handset 40. FIG. 4B shows a T-nut 24 to be attached to the external surface of the battery 48 through an adhesive material 46 where internal attachment is not possible because it would require drilling a hole through the battery 48.

FIG. 4C is an exploded view of the back of a secured wireless handset 50. In this embodiment of the first attachment, the threaded bolt 38 is threaded into the first through hole 39 of the cradle mount 31 on cradle 30 and mates with the internal threads 26 of the T-nut barrel 25. The T-nut 24 is externally attached on the battery 48 of the wireless handset 40. The wireless handset 20 shown in FIG. 3E may be also used in a similar manner with the T-nut 24 attached to the external surface of the battery cover 22.

FIG. 4D is a perspective view of a secured wireless handset 50 after the attachment of the wireless handset 40 as shown in FIG. 4B or the wireless handset 20 as shown in FIG. 3E to the cradle 30. The secured wireless handset 10 of FIG. 2A and secured wireless handset 50 of FIG. 4D can be applied to a variety of wireless handsets such as the Motorola V120 cell phone and other cell phones manufactured by Nokia, Siemens, and Samsung.

Figure 5A:
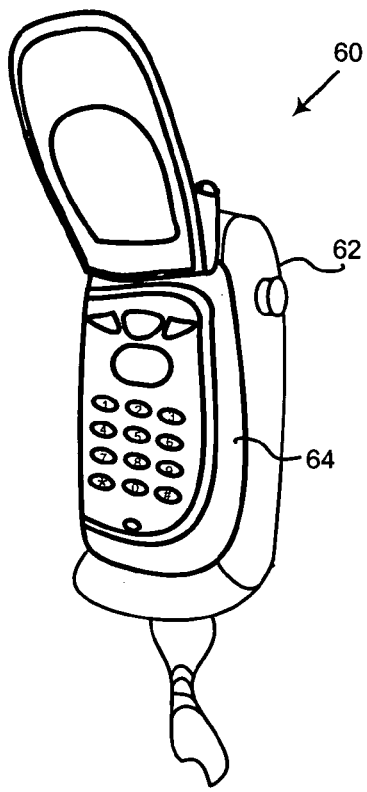
FIG. 5A is a perspective view of another secured wireless handset.

FIG. 5A is a perspective view of another secured wireless handset 60 made with a wireless handset 64 such as the Motorola V60P mounted onto the cradle 62.

Figure 5B:
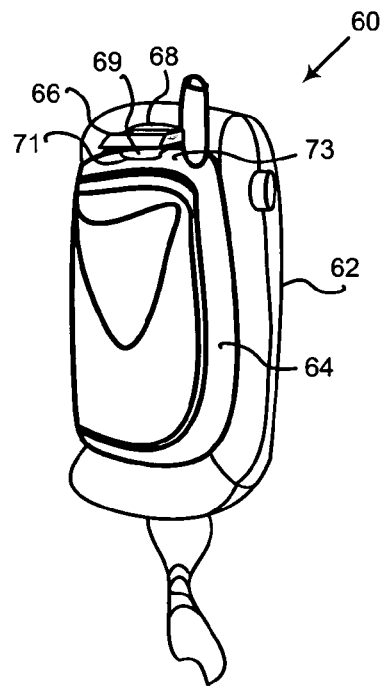
FIG. 5B is a perspective view showing the secured wireless handset with a security block.

FIG. 5B shows secured wireless handset 60 with wireless handset 64 secured in the cradle 62. In this embodiment of the first attachment, security block 66 in an opening 68 depresses a latch 69 with a lip 71 on the top 73 of wireless handset 64. The security block 66 prevents the latch 69 from moving upward and releasing the wireless handset 64. Thus, wireless handset 64 cannot be removed from cradle 62.

Figure 5D:
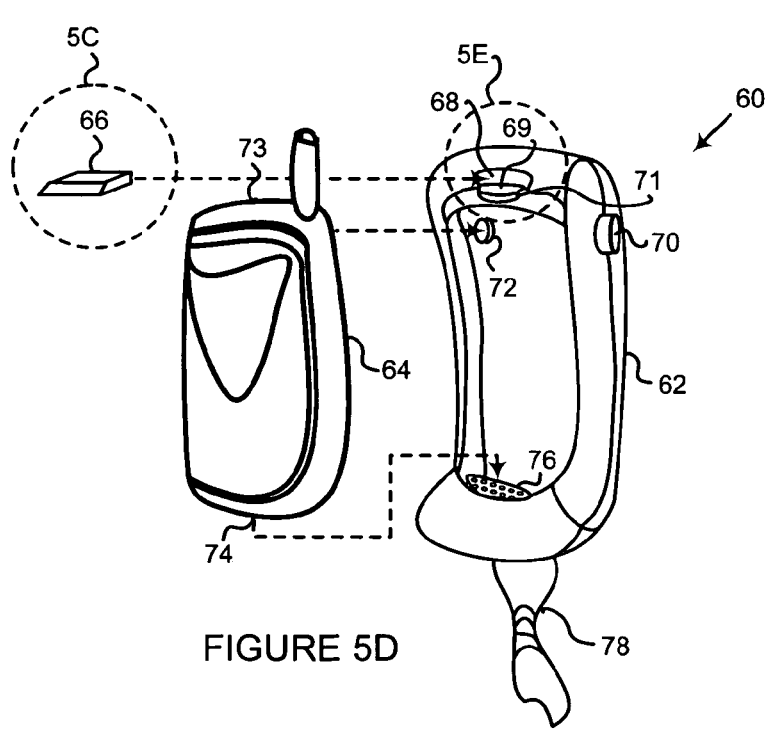
FIG. 5D is an exploded view of the secured wireless handset of FIG. 5B.
Figure 5C:
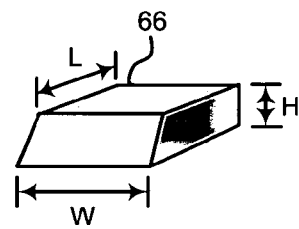
FIG. 5C is an enlarged view of the security block.

FIG. 5C is an enlarged view of the security block 66, which is any object that fits in opening 68 but preferably is a substantially rectangular shaped rigid block of wood, plastic, or metal. For the Motorola V60P, the security block 66 has one inch length, L, 0.48 inch width, W, and ⅛ inch height H. The security block 66 is shown with a beveled front so as to be flush with the front of the cradle 62.

FIG. 5D is an exploded view of the secured wireless handset 60. In assembly, the latch 69, the release latch button 70, and the latch engage button 72 all function together through a known mechanism to engage and disengage the latch 69. When the latch release button 70 is depressed against the cradle 62, the latch 69 is raised upward in the opening 68 and stays in this unlocked disengaged position while the latch engage button 72 pushes outward. When the wireless handset 64 is mounted in the cradle 62, the back of the wireless handset 64 presses against the latch engage button 72 and the mechanism triggers the latch 69 to drop and engage the wireless handset 64 so that the lip 71 grips the wireless handset top 73 securely and the latch release button 70 again extends outward. To remove the wireless handset 64 from the cradle 62, the latch release button 70 is pressed against the cradle 62, the mechanism raises the latch 69 and the lip 71 disengages the top 73 of the wireless handset 64.

By inserting the security block 66 in the opening 68 after the wireless handset 64 is mounted onto the cradle 62, the upward movement of the latch 69 is prevented when the latch release button 70 is pressed. The security block 66 may be sized to a tight fit in the latch opening 68 so it can only be removed with a tool such as tweezers to prevent easy removal. The wireless handset power and data port 74 can be electrically connected to the cradle power and data port 76 to receive DC power through a power cord 78 and allow hands free communication. The secured wireless handset 60 is secured to the vehicle dashboard.

Figure 5E:
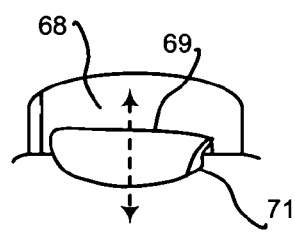
FIG. 5E is an enlarged view of the latch, the lip, and the opening of the cradle.

FIG. 5E is an enlarged view showing the latch 69 with the lip 71 that moves up and down in the opening 68 to disengage and engage the top 73 of the wireless handset 64. The secured wireless handsets 10, 50 and 60 are illustrative only and can be easily installed with many known cradle vehicle installation hardware or to other communication sites inside vehicles, boats, enclosures where wireless handsets should be secured.

What is claimed:

1. A secured wireless handset, comprising:
   a wireless handset;
   a cradle for holding the wireless handset;
   a first attachment to secure the wireless handset to the cradle; and
   a second attachment to secure the cradle to a communication site, wherein the first attachment prevents removal of the wireless handset from the cradle without use of a tool.

2. The secured wireless handset of claim 1, wherein the wireless handset is a cell phone.

3. The secured wireless handset of claim 1, wherein the wireless handset includes a removable battery cover and the first attachment is secured to the internal surface of the removable battery cover.

4. The secured wireless handset of claim 1, wherein the wireless handset includes a removable battery cover or battery and the first attachment is secured to the external surface of the removable battery cover or battery.

5. The secured wireless handset of claim 1, wherein the first attachment includes a T-nut and a matching threaded bolt.

6. The secured wireless handset of claim 5, wherein the first attachment includes adhesive materials to secure the T-nut to the wireless handset.

7. The secured wireless handset of claim 5, wherein the first attachment includes a first through hole in the cradle, a second through hole in the battery cover, wherein the barrel of the T-nut is inserted through the second through hole and held onto the internal surface of the battery cover, wherein a threaded bolt threads into the T-nut to secure the wireless handset to the cradle.

8. The secured wireless handset of claim 2, wherein the first attachment includes a T-nut secured on the back of the wireless handset, a through hole in the cradle, a threaded bolt threaded through the through hole in the cradle into the T-nut to secure the wireless handset to the cradle.

9. The secured wireless handset of claim 2, wherein the cradle uses a latch to secure the wireless handset onto the cradle, wherein the first attachment obstructs the latch to secure the wireless handset to the cradle.

10. The secured wireless handset of claim 9, wherein the first attachment includes a security block to obstruct the movement of the latch, wherein the latch releases by the removal of the security block.

11. The secured wireless handset of claim 1, wherein the second attachment includes the cradle vehicle installation hardware.

12. The secured wireless handset of claim 1, wherein the designated communication site is at a vehicle, a boat, or a fixed housing.

13. A method of securing a wireless handset to a communication site, comprising:

securing a wireless handset to a cradle through a first attachment so that the wireless handset is not freely removable from the cradle without using a tool to disassemble the first attachment between the wireless handset and the cradle; and securing the cradle to the communication site through a second attachment so that the cradle is not freely removable from the communication site without disassembling the second attachment from the communication site.

14. The method of claim 13, wherein the securing of the wireless handset to the cradle through the first attachment includes securing a T-nut to the wireless handset and threading a threaded bolt into the T-nut.

15. The method of claim 13, wherein the securing of the wireless handset to the cradle through the first attachment includes drilling a first through hole in the cradle, drilling a second through hole in the battery cover, inserting the barrel of a T-nut through the second through hole and securing the T-nut onto the internal surface of the battery cover, and threading a threaded bolt through the first through hole into the T-nut.

16. The method of claim 13, wherein the securing of the wireless handset to the cradle through the first attachment includes drilling a first through hole in the cradle, securing the T-nut onto the external surface of the battery cover or battery, and threading a threaded bolt through the first through hole into the T-nut.

17. The method of claim 13, wherein the second attachment includes using the cradle vehicle installation hardware.

18. The method of claim 13, wherein the securing of the wireless handset to the cradle through the first attachment includes using a latch on the cradle to secure the wireless handset onto the cradle and obstructing the release mechanism of the latch.

19. The method of claim 18, wherein the obstructing of the release mechanism of the latch includes inserting a security block into an opening adjacent to the latch to obstruct the movement of the latch.

* * * * *